United States Patent
Tsao et al.

(10) Patent No.: US 9,763,005 B2
(45) Date of Patent: Sep. 12, 2017

(54) ACOUSTIC ECHO CANCELLATION METHOD AND SYSTEM USING THE SAME

(71) Applicant: YUAN ZE UNIVERSITY, Taoyuan County (TW)

(72) Inventors: Yu Tsao, Taipei (TW); Shih Hau Fang, Taipei (TW); Yao Shiao, Taipei (TW); Yu-Cheng Su, Tainan (TW); Ying-Ren Chien, New Taipei (TW)

(73) Assignee: YUAN ZE UNIVERSITY, Taoyuan County (TW)

( * ) Notice: Subject to any disclaimer, the term of this patent is extended or adjusted under 35 U.S.C. 154(b) by 226 days.

(21) Appl. No.: 14/526,702

(22) Filed: Oct. 29, 2014

(65) Prior Publication Data

US 2016/0057534 A1 Feb. 25, 2016

(30) Foreign Application Priority Data

Aug. 20, 2014 (TW) .............................. 103128680 A

(51) Int. Cl.
| | |
|---|---|
| *G10K 11/16* | (2006.01) |
| *H03B 29/00* | (2006.01) |
| *A61F 11/06* | (2006.01) |
| *H04R 3/02* | (2006.01) |
| *H04M 9/08* | (2006.01) |

(52) U.S. Cl.
CPC .............. *H04R 3/02* (2013.01); *H04M 9/082* (2013.01)

(58) Field of Classification Search
CPC ........ H04M 9/08; H04M 9/082; H04M 3/402; H04S 7/301; H04R 5/04; H04R 3/02; G10L 19/0208; G10K 11/1784
USPC ............ 379/406.01, 406.08, 406.05, 406.14, 379/406.12; 381/71.1, 71.11, 71.12, 71.8, 381/58; 704/200.1
See application file for complete search history.

(56) References Cited

U.S. PATENT DOCUMENTS

| | | | | | |
|---|---|---|---|---|---|
| 5,408,530 | A | * | 4/1995 | Makino ................. | H04M 9/082 379/391 |
| 6,137,881 | A | * | 10/2000 | Oh ........................ | H04M 9/082 379/406.08 |
| 6,694,020 | B1 | * | 2/2004 | Benesty ................ | H04M 9/082 370/291 |
| 2006/0262939 | A1 | * | 11/2006 | Buchner ................ | H04S 5/005 381/56 |
| 2015/0161994 | A1 | * | 6/2015 | Tang ....................... | G10L 15/02 704/232 |

* cited by examiner

*Primary Examiner* — Vivian Chin
*Assistant Examiner* — Ubachukwu Odunukwe
(74) *Attorney, Agent, or Firm* — Li & Cai Intellectual Property (USA) Office

(57) ABSTRACT

The present disclosure illustrates an acoustic echo cancellation method and system using the same. The acoustic echo cancellation method comprises the following steps. Firstly, a prior-knowledge matrix comprising a plurality of space vectors is built. Then, an initial filter vector is generated by the prior-knowledge matrix and an initial weighting vector. The weighting vector is updated based on the difference of the echo signal and the estimated signal in an iteration algorithm, and the coefficient of the filter vector is updated according to the updated weighting vector. An estimated signal is generated according to the updated filter vector and the original signal. Finally, the next echo signal is cancelled by the near-end estimated signal.

6 Claims, 3 Drawing Sheets

ACOUSTIC ECHO CANCELLATION METHOD AND SYSTEM USING THE SAME

BACKGROUND

1. Technical Field

The present disclosure relates to an acoustic echo cancellation, in particular, to the acoustic echo cancellation method and system using the same based on the prior-knowledge matrix.

2. Description of Related Art

Thanks to technology, users can communicate with other people at all times anywhere. However, it is still inconvenient to communicate in some situations by using handheld communication apparatuses.

For example, drivers use handheld communication apparatuses while driving is prohibited; or when a presenter communicates with people, the handheld communication apparatus is harassing to the presenter. Thus, the hands-free communication system is widely in use in people's life. The bilateral-side or multi-side communication such as the multimedia conference, remote teaching, satellite communication, video phone, and network phone all require the hands-free communication system. The hands-free communication system means that the speaker and microphone are not disposed in the same apparatus and are located at different fixed positions in the same room.

However, there exists a problem with the hands-free communication system. Using the bilateral-side or multi-side communication, the user in the far-end room may hear his/her voice at the previous time point, and this generates an acoustic echo. Since the voice of the user in the far-end room is outputted from the speaker in the near-end room, and the voice of the user in the far-end room is reflected with the wall or other objects in the near-end room. Therefore, a part of the reflected voice is also received by the microphone with the voice of another user in the near-end room simultaneously. In other words, the acoustic echo has Multipath Inference.

The acoustic echo in the voice transmission may influence the quality of the communication; furthermore this causes the user in the far-end room to not be able to differentiate the message spoken by another user in the near-end room. Thus, there still exist many issues to be improved in the quality of the communication.

SUMMARY

An exemplary embodiment of the present disclosure provides an acoustic echo cancellation method. The method comprises the following steps. Firstly, a prior-knowledge matrix comprising a plurality of space vectors is built. Then, an initial filter vector is generated by the prior-knowledge matrix and initial weighting vector. The weighting vector is updated based on the difference of echo signal and estimated signal in an iteration algorithm. The coefficient of the filter vector is updated according to the updated weighting vector. Then, the estimated signal is obtained by the updated filter vector and the original signal. Finally, the next echo signal is canceled by the estimated signal.

An exemplary embodiment of the present disclosure provides an acoustic echo cancellation system. The system comprises a prior-knowledge generator and an adaptive filter. The adaptive filter couples to the prior-knowledge generator. The prior-knowledge generator is configured for building a prior-knowledge matrix comprising a plurality of space vectors. The adaptive filter is configured for generating a filter vector by the prior-knowledge matrix and a weighting vector. The weighting vector is calculated based on the difference of the echo signal and the estimated signal in an iteration algorithm. The echo signal is generated by the convolution of the original signal with a room impulse response of a near-end room. Wherein the adaptive filter generates a near-end estimated signal, which is used to cancel the next echo signal.

To sum up, the acoustic echo cancellation method and system utilize prepared space vectors as the base to update the coefficient of the adaptive filter, to increase the robustness and the efficiency in the estimation processing. In other words, the convergence rate of the algorithm is raised by incorporating previous room impulse responses. Thus, the present disclosure shows better convergence rates and lower error rates compared to traditional acoustic echo cancellation methods, accordingly improving the quality of the communication.

In order to further understand the techniques, means and effects of the present disclosure, the following detailed descriptions and appended drawings are hereby referred to, such that, and through which, the purposes, features and aspects of the present disclosure can be thoroughly and concretely appreciated, however, the appended drawings are merely provided for reference and illustration, without any intention that they are used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings.

Figure 1:
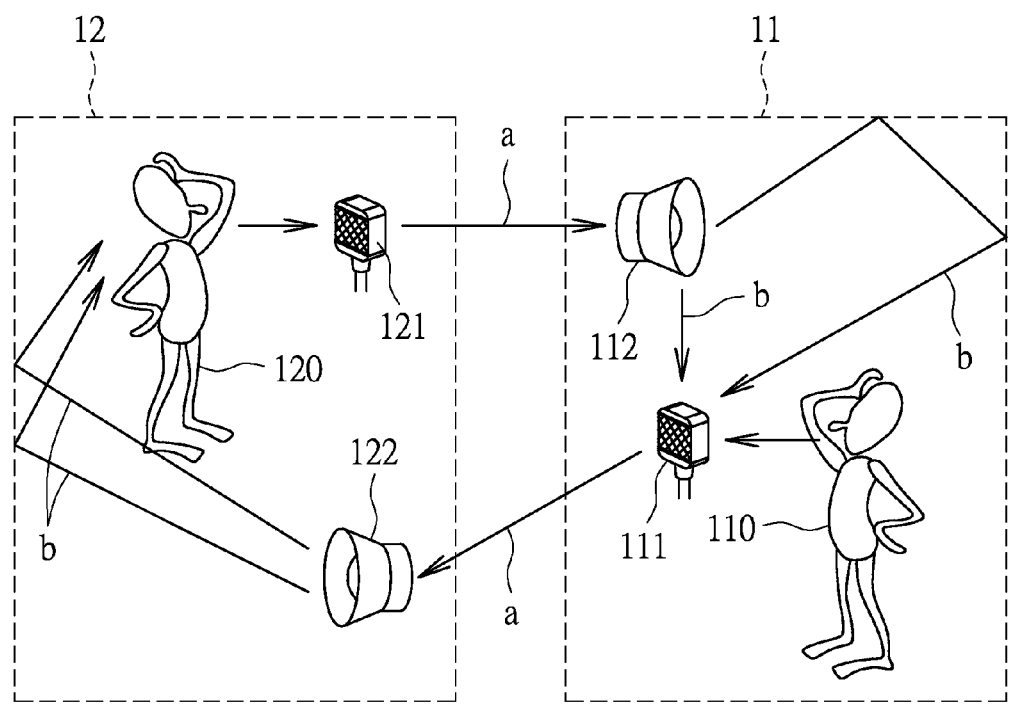
FIG. 1 shows a diagram of acoustic echo generating in the communication system according to an embodiment in the present disclosure.

Please refer to FIG. 1. FIG. 1 shows a diagram of acoustic echo generating in the communication system according to an embodiment in the present disclosure. Users 110 and 120 are located respectively in a near-end room 11 and a far-end room 12 in communication. Generally, a communication can be simplified into two rooms such as the near-end room 11 and the far-end room 12. For example, the user 120 in the far-end room 12 communicates with the user 110, and the user 110 uses the hands-free system to communicate in the near-end room 11. The near-end room 11 comprises a microphone 111 and speaker 112, and the far-end room 12 comprises a microphone 121 and speaker 122. The microphones 111, 121 and speakers 112, 122 are located in fixed locations shown as FIG. 1. However, problems happen when the users 110, 120 communicate to each other by the hands-free apparatus. For example, when the users 110, 120 perform the bilateral-side or multi-side communication, the voice of the user 120 in the far-end room 12 is outputted from the speaker 112 in the near-end room 11, and the voice of the user in the far-end room 11 is reflected with the wall or other objects (e.g., a reflection path b in FIG. 1) in the near-end room 11. Therefore, a part of the reflected voice is also received by the microphone 111 with the voice of the user 110 in the near-end room 11 simultaneously and transmits back to the far-end room 12, and the user 120 in the far-end room 12 hears his/her voice at the previous time point. In other words, the voice is transmitted from the microphone 111 to the speaker 122 in the far-end room 12 through a signal path a, which comprises the original voice of the user 110 and the voice of the user 120 at the previous time point, through the reflection path b, that is the acoustic echo. On the contrary, the far-end room 12 also has the same problem as the near-end room 11.

Figure 2:
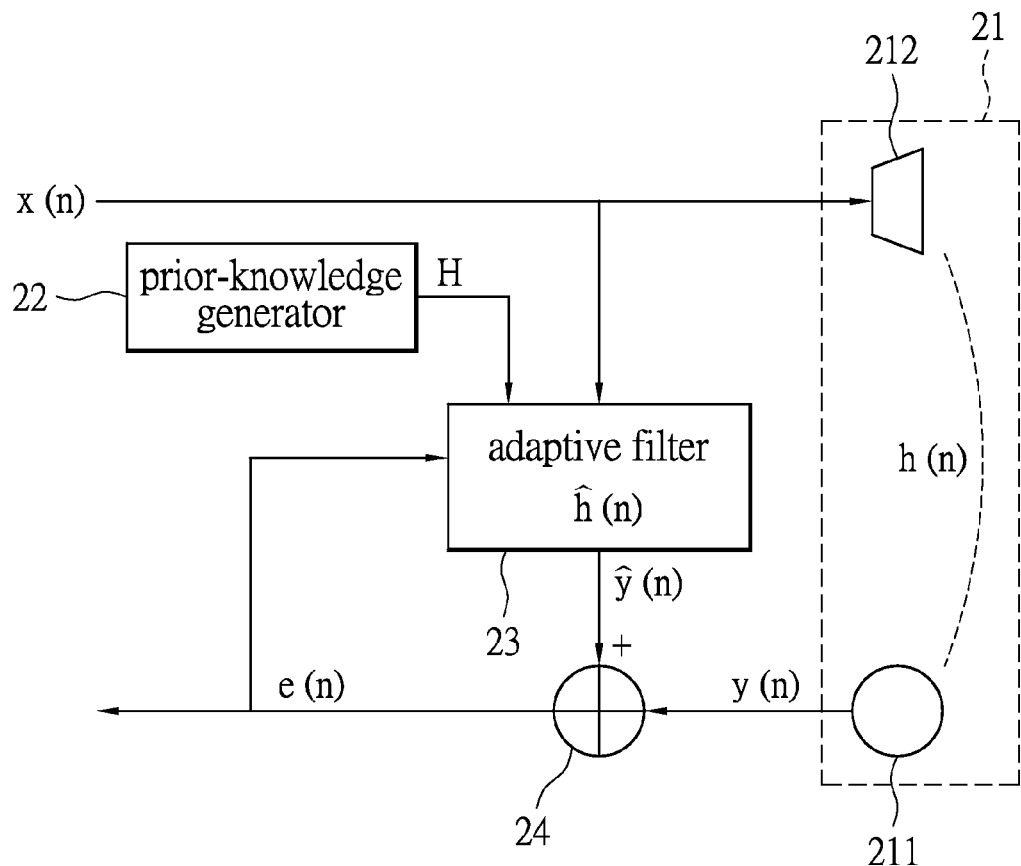
FIG. 2 shows a diagram of an acoustic echo cancellation system according to an embodiment in the present disclosure.

Please refer to FIG. 2. FIG. 2 shows a diagram of an acoustic echo cancellation system according to an embodiment in the present disclosure. It is illustrated by the near-end room 21 in FIG. 2. The acoustic echo cancellation system 2 comprises a near-end room 21, a prior-knowledge generator 22, an adaptive filter 23, and an adder 24. The near-end room 21 comprises a microphone 211 and a speaker 212. The adaptive filter 23 couples to the prior-knowledge generator 22.

Original signal x(n) is transmitted from the far-end room (e.g., the voice signal of the user 120 is transmitted by the microphone 121 in FIG. 1). The echo signal y(n) comprises the original signal x(n) outputted from the speaker 212 and the impulse response signal of the room impulse response h(n) in the near-end room 21. A filter vector ĥ(n) is estimated to characterize the room impulse response h(n) of the near-end room 21. The echo signal y(n) is formed by the original signal x(n) convoluted with the room impulse response h(n), such as h(n)*x(n). More specifically, the echo signal y(n) is formed by the original signal x(n) convoluted with the room impulse response h(n) of the near-end room 21. It is worth to note that the filter vector ĥ(n) is estimated in an iteration manner to match the room impulse response h(n) of the near-end room 21. Accordingly, the estimated signal ŷ(n) is more and more closer to y(n). An error signal e(n) is the difference of the echo signal y(n) and the estimated signal ŷ(n). In detail, with the estimated signal ŷ(n), a new error signal e(n) is generated to adjust a weighting vector (illustrated following). The weighting vector updates the filter vector ĥ(n) and enables the estimated signal ŷ(n) to be close to the echo signal y(n). In other words, the error signal e(n) may be close to zero.

The prior-knowledge generator 22 is configured for building a prior-knowledge matrix H. Specifically, the prior-knowledge means utilizing the data collected previously to calculate the impulse response accurately. In the embodiment of the present disclosure, the prior-knowledge matrix H is formed by a plurality of space vectors, and each vector represents a particular channel characteristic. In other words, the vectors represent different sizes or forms of the rooms, such as 1 m*m, 2 m*m, or 3 m*m, the present disclosure is not limited thereto.

The proposed algorithm consists of two stages. The first stage is building a set of prior-knowledge. In other words, numerous training data such as man-made data or natural and simulation data are collected to prepare the prior-knowledge. The second stage is on-line operating or calculating based on the prepared prior-knowledge. Thus, if the first stage is prepared more carefully, the second stage can provide better performance.

The adaptive filter 23 generates an initial filter vector ĥ(n) by the prior-knowledge matrix H and an initial weighting vector, and accordingly generates the initial estimated signal ŷ(n). The difference of the estimated signal ŷ(n) and the echo signal y(n) is used to update the weighting vector in an iteration manner. The weighting vector then updates the filter vector ĥ(n) and accordingly the estimated signal ŷ(n) to minimize the difference of ŷ(n) and y(n). Then, the adaptive filter 23 generates a filter vector ĥ(n) based on the updated weighting vector. The computed ĥ(n) is used to compute ŷ(n) and cancel the next echo signal y(n). The error signal e(n) may be close to the zero after the estimated signal ŷ(n) is calculated thru many iterations.

It is worth noting, in the embodiment of the present disclosure, the weighting vector is formed by a weighting coefficient and a bias vector. The iteration algorithm can be a single dimensional input algorithm, such as Least Mean Square (LMS) and Normalized LMS (NLMS), or a multi-dimensional input algorithm, such as Affine Projection Algorithm (APA), Proportionate Affine Projection Algorithm (PAPA), Improvement Proportionate Affine Projection Algorithm (IPAPA), and LevenbergMarquardt Regularized APA (LMR-APA), etc. However, the present disclosure is not limited thereto. The above algorithms are further illustrated as follows.

First Stage (Off-Line)

Builds a set of the prior-knowledge, which is the prior-knowledge matrix H as equation (1). Wherein the prior-knowledge matrix H comprises K vectors $[h_0^1 \ h_2^1 \ldots h_{L-1}^1]^T$, $[h_0^2 \ h_2^2 \ldots h_{L-1}^2]^T, \ldots, [h_0^K \ h_2^K \ldots h_{L-1}^K]^T$ generated by the adaptive filter 23 adapted with reference spaces. Those K vectors are collected to generate a vector matrix $H = [h^1 \ldots h^K]$. The coefficients are the vector spaces.

$$H = \begin{bmatrix} h_0^1 & \ldots & h_0^K \\ \vdots & \ddots & \vdots \\ h_{L-1}^1 & \ldots & h_{L-1}^K \end{bmatrix} \quad (1)$$

Second Stage (On-line)

A new matrix $S = [H | I_{L \times L}]$ is generated by combining an identity matrix $I_{L \times L}$ with the prior-knowledge matrix H as equation (2) as follows.

$$S = \left\{ \begin{matrix} h_0^1 & \ldots & h_0^K \\ \vdots & \ddots & \vdots \\ h_{L-1}^1 & \ldots & h_{L-1}^K \end{matrix} \middle| \begin{matrix} 1 & 0 & 0 \\ 0 & \ddots & 0 \\ 0 & 0 & 1 \end{matrix} \right\} \quad (2)$$

The filter vector ĥ(n) is calculated by the weighting vector ŵ(n) with the matrix S. More specifically, the weighting vector $\hat{w}(n) = [a(n)^T b(n)^T]^T$ is an (L+K)-dimensional vector, wherein the $a(n) = [a_1(n) \ldots a_K(n)]^T$ is a K-dimensional weighting vector and $b(n) = [b_1(n) \ldots b_K(n)]^T$ is an L-dimensional initial vector. Thus, the filter vector ĥ(n) can be shown as equation (3) as follows.

$$\hat{h}(n) = S\hat{w}(n) = \left\{\begin{pmatrix} h_0^1 & \cdots & h_0^K \\ \vdots & \ddots & \vdots \\ h_{L-1}^1 & \cdots & h_{L-1}^K \end{pmatrix} \middle| \begin{pmatrix} 1 & 0 & 0 \\ 0 & \ddots & 0 \\ 0 & 0 & 1 \end{pmatrix} \right\} * \begin{bmatrix} a_1(n) \\ \vdots \\ a_K(n) \\ b_1(n) \\ \vdots \\ b_L(n) \end{bmatrix} \quad (3)$$

The affine projection algorithm and the proportionate affine projection algorithm are illustrated as follows.

Vector-space A (fine Projection Algorithm (VAPA)

$$\min_{S\hat{w}(n)} \|S\hat{w}(n) - S\hat{w}(n-1)\| \quad (4)$$

$$e(n) = y(n) - X^T S\hat{w}(n) = 0 \quad (5)$$

For calculating the $\hat{w}(n)$, the equation (4) and (5) are solved by Lagrange to formulate the equation (6).

$$L(\hat{w}(n),\lambda) = \|S\hat{w}(n) - S\hat{w}(n-1)\|^2 + [y(n) - X^T(n)S\hat{w}(n)]^T \Lambda \quad (6)$$

Wherein $\Lambda = [\Lambda_0 \ \Lambda_1 \ \ldots \ \Lambda_{P-1}]$ is a vector of Lagrange, and the equation (7) is derived from the equation (6).

$$2S^T(S\hat{w}(n-1) - S\hat{w}(n)) + S^T X(n)\Lambda = 0 \quad (7)$$

Then, assuming $J = S^T SS^T$ and simplifying the equation (7), merges the equation (5) to obtain the equation (8).

$$y(n) - X^T(n)S\left(w(n-1) + \frac{1}{2}J^{-1}X(n)\Lambda\right) = 0 \quad (8)$$

Assuming $U = SJ^{-1}$, we can obtain the equation (9).

$$\Lambda = (X^T(n)UX(n))^{-1} 2e(n) \quad (9)$$

Therefore, by taking the equation (9) back into the equation (7), $\hat{w}(n)$ can be updated. In other words, $\hat{w}(n)$ is updated by equation (10) as follows.

$$\hat{w}(n) = \hat{w}(n-1) + \mu' J^{-1} X(n)(X^T(n)UX(n) + \delta' I_{p \times p})^{-1} e(n) \quad (10)$$

Where $\mu'$ is a step, and $\delta'$ is a small normalized constant, which is configured for avoiding the inverse matrix to be zero.

Vector-space Proportionate Arne Projection Algorithm (VPAPA)

The derivation of the proportionate affine projection algorithm is similar to the derivation of the affine projection algorithm. The equation (6) is changed as follows.

$$L(\hat{w}(n),\lambda) = \|S\hat{w}(n) - S\hat{w}(n-1)\|^2 + [y(n) - X^T(n)G(n)S\hat{w}(n)]^T \Lambda' \quad (11)$$

Wherein $\Lambda'$ is a new Lagrange, G(n) is an L*L diagonal matrix. $g_l(n), l=0, \ldots, L-1$ is shown as the elements in the diagonal matrix. The equation (12) is derived from the equation (11) as follows.

$$2S^T(S\hat{w}(n-1) - S\hat{w}(n)) + S^T G(n)X(n)\Lambda' = 0 \quad (12)$$

Then, assuming $J = S^T SS^T$ and simplifying the equation (12), merges the equation (5) to obtain the equation (13).

$$y(n) - X^T(n)S\left(\hat{w}(n-1) + \frac{1}{2}J^{-1}G(n)X(n)\Lambda'\right) = 0 \quad (13)$$

Assuming $U = SJ^{-1}$, we can obtain the equation (14).

$$\Lambda = (X^T(n)UG(n)X(n))^{-1} 2e(n) \quad (14)$$

After solving the new Lagrange, the $\hat{w}(n)$ can be updated by taking the equation (14) back into the equation (12). In other words, the $\hat{w}(n)$ is the iteration of the vector-space proportionate affine projection algorithm in equation (15) as follows.

$$\hat{w}(n) = \hat{w}(n-1) + \mu' J^{-1} G(n)X(n)(X^T(n)UX(n) + \delta' I_{p \times p})^{-1} e(n) \quad (15)$$

Wherein the $\mu'$ is a step, and $\delta'$ is a small normalized constant, which is configured for avoiding the inverse matrix to be zero.

Figure 3:
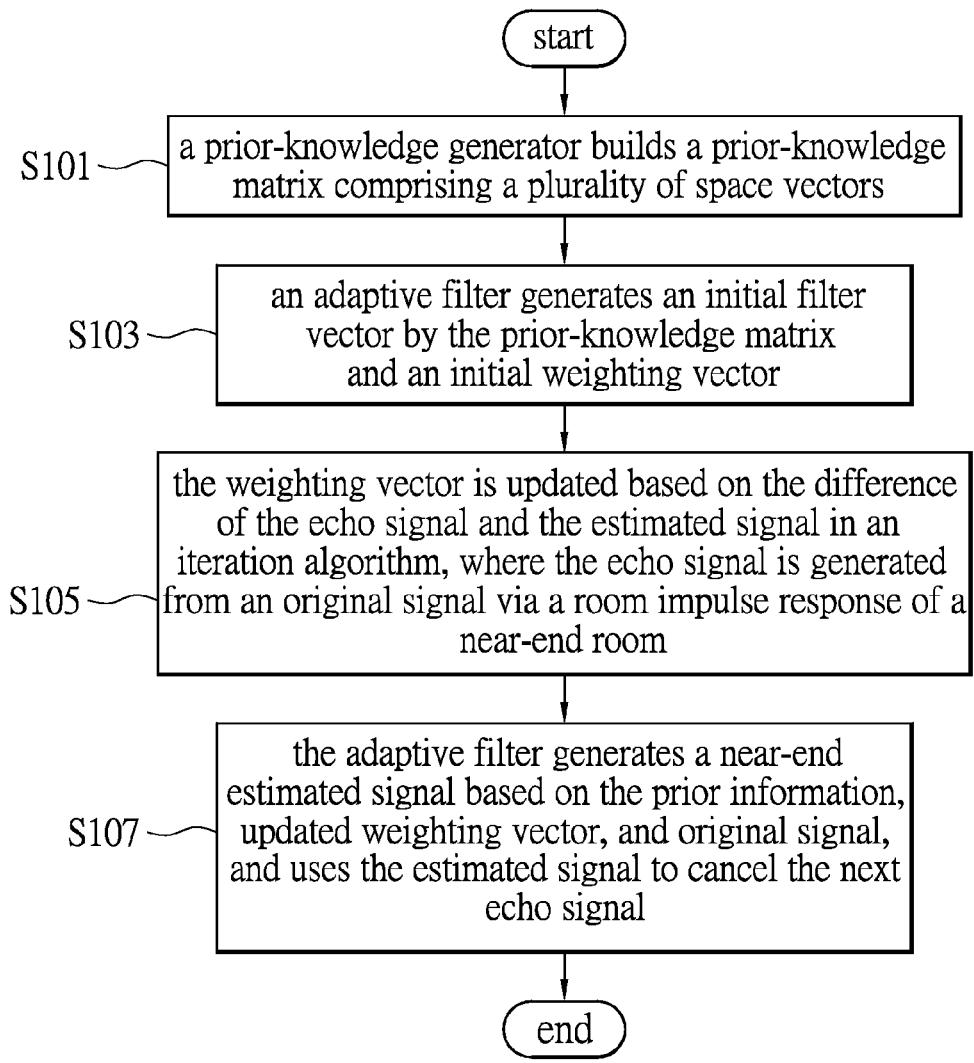
FIG. 3 shows a flowchart of an acoustic echo cancellation method according to an embodiment in the present disclosure.

FIG. 3 shows a flowchart of acoustic echo cancellation method according to an embodiment in the present disclosure. In the step S101, a prior-knowledge generator builds a prior-knowledge matrix comprising a plurality of channel vectors; in the step S103, an adaptive filter generates an initial vector filter by the prior-knowledge matrix and an initial weighting vector; in the step S105, the weighting vector is updated based on the difference of the echo signal and the estimated signal in an iteration algorithm, where the echo signal is generated from an original signal via a room impulse response of a near-end room; in the step S107, the adaptive filter generates a near-end estimated signal based on the updated weighting vector and uses the estimated signal to cancel the next echo signal.

Please refer to FIG. 3 in conjunction with FIG. 2. In the step S101, the prior-knowledge matrix H is built by the prior-knowledge generator 22. Actually, before the adaptive filter 23 filtering (e.g., Off-line Stage), the adaptive filter 23 collects the numerous training data to build the prior-knowledge. In other words, the prior-knowledge is formed by a set of space vectors generated by the adaptive filter 23 previously, where each vector corresponds to a space identity vector. By using the prior-knowledge matrix H, the adaptive filter can raise the convergence rate Next, in the step S103, the adaptive filter 23 generates an initial filter vector h(n) by the prior-knowledge matrix H and the initial weighting vector. More specifically, the room impulse response h(n) of the near-end room 21 can be simulated by the weighting vector and the prior-knowledge matrix H. In the embodiment of the present disclosure, the adaptive filter 23 combines the vectors in H using weighting coefficients and bias coefficients in the weighting vector.

In the step S105, the adaptive filter 23 calculates estimated signal ŷ(n) to match the echo signal y(n) in an iteration algorithm by the adder 24, where y(n) is generated from an original signal x(n) via a room impulse response h(n) of a near-end room 21. The adaptive filter 23 adjusts the weighting vector and thus filter vector ĥ(n) according to the difference of y(n) and ŷ(n). It is worth noting, the update method of the estimated signal ŷ(n) is not limited by vectors, also can be single values such as that used in LMS and NLMS. The embodiment of the present disclosure is implemented to optimize the active region and non-active region of the convergence rate by the multi-dimensional input, but is not limited thereto.

In the step S107, the adaptive filter 23 generates a near-end estimated signal ŷ(n) based on the prior-knowledge matrix H, the updated weighting vector, and the original signal. The weighting vector is first updated, the coefficient of the filter vector ĥ(n) is then updated according to the updated weighting vector, and finally a new near-end estimated signal ŷ(n) is generated. The next echo signal y(n) is cancelled by the new near-end estimated signal ŷ(n), and a new near-end estimated signal ŷ(n) is then generated (that is the iteration algorithm). More specifically, after the coefficients of the weighting vector is updated in step S105, the adaptive filter calculates a new near-end estimated signal ŷ(n) and computes an error signal, e(n), which is used to update the coefficient of the weighting vector. After the coefficient of the weighting vector is updated, the estimated signal ŷ(n) becomes closer to the echo signal y(n). Thus, the error signal e(n) is close to zero. In other words, the estimated signal ŷ(n) is generated to cancel the echo signal y(n) generated from the original signal x(n) via the room impulse response h(n) of the near-end room 21.

To sum up, the acoustic echo cancellation method and system utilize a set of space vectors to update the coefficient of the adaptive filter to increase the robustness and the efficiency in the estimation processing. In other words, the convergence rate of the algorithm is raised by estimating the previous room impulse response. Thus, the present disclosure shows better convergence rate of the algorithm and lower error rate compared to the traditional acoustic echo cancellation method, and raises the quality of the communication. On the other hand, the environment using a microphone and speaker (e.g., SKYPE, hands-free system in car . . . , etc.) has better voice quality for a listener because of the convergence rate in high speed to avoid the acoustic echo.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An acoustic echo cancellation method, adapted for an adaptive filter, comprising:
    collecting numerous training data to build prior-knowledge formed by a set of space vectors, wherein the vectors represent different sizes or forms of rooms as follows $[h_0^1 \ h_2^1 \ \ldots \ h_{L-1}^1]^T$, $[h_0^2 \ h_2^2 \ \ldots \ h_{L-1}^2]^T, \ldots, [h_0^K \ h_2^K \ \ldots \ h_{L-1}^K]^T$;
    building a prior-knowledge matrix H including a plurality of space vectors as follows $$H = \begin{bmatrix} h_0^1 & \cdots & h_0^K \\ \vdots & \ddots & \vdots \\ h_{L-1}^1 & \cdots & h_{L-1}^K \end{bmatrix};$$

generating an initial filter vector by the prior-knowledge matrix and an initial weighting vector, and obtaining an initial estimated signal by the initial filter vector and an original signal;
    updating a weighting vector based on the difference of an echo signal and an estimated signal in an iteration algorithm to estimate a room impulse response of a near-end room;
    generating a near-end filter vector corresponding to the impulse response according to the updated weighting vector; and
    cancelling a next echo signal by a near-end estimated signal;
    wherein the adaptive filter is adapted with a plurality of reference spaces to generate the space vectors corresponding to the reference spaces;
    wherein the weighting vector is formed by a weighting coefficient and a bias vector;
    wherein a matrix S is generated by combining the prior-knowledge matrix H with an identity matrix $I_{L \times L}$, and the matrix S is shown as follows $$S = \left\{ \begin{array}{ccc} h_0^1 & \cdots & h_0^K \\ \vdots & \ddots & \vdots \\ h_{L-1}^1 & \cdots & h_{L-1}^K \end{array} \middle| \begin{array}{ccc} 1 & 0 & 0 \\ 0 & \ddots & 0 \\ 0 & 0 & 1 \end{array} \right\};$$

wherein the matrix S is multiplied with an initial weighting vector ŵ(n) to generate the initial filter vector ĥ(n) as follows $$\hat{h}(n) = S\hat{w}(n) = \left\{ \begin{array}{ccc} h_0^1 & \cdots & h_0^K \\ \vdots & \ddots & \vdots \\ h_{L-1}^1 & \cdots & h_{L-1}^K \end{array} \middle| \begin{array}{ccc} 1 & 0 & 0 \\ 0 & \ddots & 0 \\ 0 & 0 & 1 \end{array} \right\} * \begin{bmatrix} a_1(n) \\ \vdots \\ a_K(n) \\ b_1(n) \\ \vdots \\ b_L(n) \end{bmatrix},$$

wherein the initial weighting vector $\hat{w}(n)=[a(n)^T b(n)^T]^T$ is an (L+K)-dimensional vector, $a(n)=[a_1(n) \ldots a_K(n)]^T$ is a K-dimensional weighting vector and $b(n)=[_1(n) \ldots b_L(n)]^T$ is an L-dimensional initial vector.

2. The acoustic echo cancellation method according to claim 1, wherein the iteration algorithm is a multi-dimensional input algorithm.

3. The acoustic echo cancellation method according to claim 2, wherein the iteration algorithm is an Affine Projection Algorithm (APA), a Proportionate Affine Projection Algorithm (PAPA), or an Improvement Proportionate Affine Projection Algorithm (IPAPA).

4. An acoustic echo cancellation system, comprising:
    an adaptive filter configured for collecting numerous training data to build prior-knowledge formed by a set of space vectors, wherein the vectors represent different sizes or forms of rooms as follows $[h_0^1 \ h_2^1 \ \ldots \ h_{L-1}^1]^T$, $[h_0^2 \ h_2^2 \ \ldots \ h_{L-1}^2]^T, \ldots, [h_0^K \ h_2^K \ \ldots \ h_{L-1}^K]^T$, generating an initial filter vector by a prior-knowledge matrix H and an initial weighting vector, and updating a weighting vector based on the difference of an echo signal and an estimated signal in an iteration algorithm to estimate an impulse response signal of a near-end room;
    wherein the adaptive filter generates a near-end estimated signal corresponding to the prior knowledge, the updated weighting vector, and an original signal, and cancels a next echo signal by a near-end estimated signal;

wherein the adaptive filter is adapted with a plurality of reference spaces to generate the space vectors corresponding to the reference spaces;

wherein the weighting vector is formed by a weighting coefficient and a bias vector;

wherein the prior-knowledge matrix H includes a plurality of space vectors as follows $$H = \begin{bmatrix} h_0^1 & \cdots & h_0^K \\ \vdots & \ddots & \vdots \\ h_{L-1}^1 & \cdots & h_{L-1}^K \end{bmatrix};$$

wherein a matrix S is generated by combining the prior-knowledge matrix H with an identity matrix $I_{L \times L}$, and the matrix S is shown as follows $$S = \left\{ \begin{array}{ccc|ccc} h_0^1 & \cdots & h_0^K & 1 & 0 & 0 \\ \vdots & \ddots & \vdots & 0 & \ddots & 0 \\ h_{L-1}^1 & \cdots & h_{L-1}^K & 0 & 0 & 1 \end{array} \right\};$$

wherein the matrix S is multiplied with an initial weighting vector $\hat{w}(n)$ to generate the initial filter vector $\hat{h}(n)$ as follows $$\hat{h}(n) = S\hat{w}(n) = \left\{ \begin{array}{ccc|ccc} h_0^1 & \cdots & h_0^K & 1 & 0 & 0 \\ \vdots & \ddots & \vdots & 0 & \ddots & 0 \\ h_{L-1}^1 & \cdots & h_{L-1}^K & 0 & 0 & 1 \end{array} \right\} * \begin{bmatrix} a_1(n) \\ \vdots \\ a_K(n) \\ b_1(n) \\ \vdots \\ b_L(n) \end{bmatrix},$$

wherein $\hat{w}(n) = [a(n)^T b(n)^T]^T$ is an (L+K)-dimensional vector, $a(n) = [a_1(n) \ldots a_K(n)]^T$ is a K-dimensional weighting vector and $b(n) = [b_1(n) \ldots b_L(n)]^T$ is an L-dimensional initial vector.

5. The acoustic echo cancellation system according to claim 4, wherein the iteration algorithm is a multi-dimensional input algorithm.

6. The acoustic echo cancellation system according to claim 5, wherein the iteration algorithm is an Affine Projection Algorithm, a Proportionate Affine Projection Algorithm, or an Improvement Proportionate Affine Projection Algorithm.

* * * * *